United States Patent
Kinoshita et al.

(10) Patent No.: US 7,022,267 B2
(45) Date of Patent: Apr. 4, 2006

(54) FLAME RETARDANT TREATING AGENTS, FLAME RETARDANT TREATING PROCESS AND FLAME RETARDANT TREATED FIBERS

(75) Inventors: Hirotaka Kinoshita, Fukui (JP); Toru Makino, Fukui (JP); Takao Yamashita, Fukui (JP); Koji Midori, Fukui (JP); Kenichi Ikemoto, Ibaraki (JP); Hiroshi Sumitomo, Ibaraki (JP)

(73) Assignee: Nicca Chemical Co., Ltd., Fukui (JP)

( * ) Notice: Subject to any disclaimer, the term of this patent is extended or adjusted under 35 U.S.C. 154(b) by 216 days.

(21) Appl. No.: 10/203,264

(22) PCT Filed: Mar. 13, 2002

(86) PCT No.: PCT/JP02/02367

§ 371 (c)(1),
(2), (4) Date: Aug. 7, 2002

(87) PCT Pub. No.: WO02/074880

PCT Pub. Date: Sep. 26, 2002

(65) Prior Publication Data

US 2003/0034482 A1   Feb. 20, 2003

(30) Foreign Application Priority Data

Mar. 21, 2001 (JP) .......................... P2001-081088

(51) Int. Cl.
- *C07D 105/04* (2006.01)
- *A01N 9/36* (2006.01)
- *B01J 1/16* (2006.01)
- *C08K 5/23* (2006.01)
- *B32B 9/00* (2006.01)

(52) U.S. Cl. ............... 252/608; 252/609; 8/115.56; 8/115.61; 428/264; 428/265; 428/272; 428/273; 428/276; 428/277; 524/101; 524/148; 524/151; 524/230; 524/311

(58) Field of Classification Search ................. 57/904; 427/393; 8/115, 115.61, 115.56; 524/117, 524/101, 148, 151, 230, 311; 252/608–609; 428/264, 265, 272–273, 276–277
See application file for complete search history.

(56) References Cited

U.S. PATENT DOCUMENTS

| | | | | |
|---|---|---|---|---|
| 3,702,878 A | * | 11/1972 | Saito et al. | ........... 558/82 |
| 4,198,492 A | | 4/1980 | Izawa et al. | |
| 4,244,893 A | * | 1/1981 | Dursch et al. | ........... 558/158 |
| 4,317,769 A | | 3/1982 | Saito et al. | |

FOREIGN PATENT DOCUMENTS

| | | |
|---|---|---|
| JP | 50-17979 | 6/1975 |
| JP | 53056250 | 5/1978 |
| JP | 55-124792 | 9/1980 |
| JP | 56-9178 | 2/1981 |
| JP | 2001-011775 | 1/2001 |
| JP | 2001-11775 | 1/2001 |
| JP | 2001-310387 | 11/2001 |

* cited by examiner

*Primary Examiner*—Yogendra N. Supta
*Assistant Examiner*—Preeti Kumar
(74) *Attorney, Agent, or Firm*—Leydig, Voit & Mayer, Ltd.

(57) ABSTRACT

The flame retardant treating agent of the invention comprises a phosphorus-based compound represented by the following formula (4), for example.

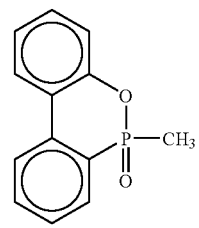

(4)

According to the invention, a polyester fiber woven fabric is immersed in a treatment solution containing the flame retardant treating agent and is heat treated at a prescribed temperature in order to fix the flame retardant treating agent to the polyester fiber woven fabric to obtain flame retardant treated fiber. As a result, it is possible to maintain adequate fiber cleaning durability and achieve a sufficient flame retardant property even by post-treatment, without using halogen-based compounds.

7 Claims, No Drawings

FLAME RETARDANT TREATING AGENTS, FLAME RETARDANT TREATING PROCESS AND FLAME RETARDANT TREATED FIBERS

TECHNICAL FIELD

The present invention relates to flame retardant treating agents, a flame retardant treating process and flame retardant treated fibers, and more specifically, it relates to flame retardant treating agents which can impart a flame retardant property to fibers by post-treatment, to a flame retardant treating process whereby fibers are imparted with a flame retardant property, and to flame retardant treated fibers obtained by the flame retardant treating process.

BACKGROUND ART

Halogenated cycloalkane compounds such as hexabromocyclododecane are commonly employed as flame retarding components in flame retardant treating processes whereby fibers are imparted with a flame retardant property for maintenance of cleaning durability (durability against wet washing such as water washing, or dry cleaning). Also, Japanese Unexamined Patent Publication SHO No. 60-259674 discloses a flame retardant treating process employing as the flame retarding component a mixture of a halogenated cycloalkane compound such as hexabromocyclododecane with a phosphonate compound.

DISCLOSURE OF THE INVENTION

In recent years, however, with increasing awareness of issues such as protection of the natural environment and protection of living environments, there has been a demand for flame retardant treating processes which employ halogen-free compounds which contain no halogen elements as the flame retardant treating agents, and which allow cleaning durability to be maintained even by post-treatment of fibers. From the standpoint of environmental conservation as well, there is an increasing demand for flame retardant treated fibers that generate no harmful halogen gases or residues during combustion, i.e., flame retardant treated fibers that do not employ halogen compounds as the flame retardant treating agents.

The present invention has been accomplished in light of these circumstances, and its object is to provide flame retardant treating agents and a flame retardant treating process which allow fibers to maintain adequate cleaning durability, and can impart a sufficient flame retardant property by post-treatment, despite using non-halogen compounds as the flame retardant treating agents, as well as flame retardant treated fibers which do not employ halogen compounds as the flame retardant treating agents.

As a result of much diligent research with the aim of achieving this object, the present inventors have completed the present invention upon finding that it is possible to impart fibers with a flame retardant property which provides adequate cleaning durability, by using specific phosphorus-based compounds as flame retarding components.

Specifically, a flame retardant treating agent according to the invention comprises at least one (type) of the following:

a first phosphorus-based compound represented by the following formula (1):

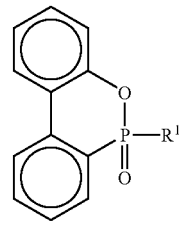

where $R^1$ represents an alkyl, hydroxyalkyl or substituted or unsubstituted aralkyl group, or a group represented by the following formula (2):

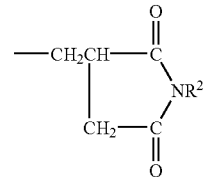

(where $R^2$ represents an alkyl group of 1–10 carbons), and a second phosphorus-based compound represented by the following formula (3):

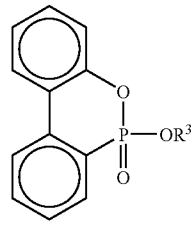

where $R^3$ represents hydrogen or an alkyl or substituted or unsubstituted aralkyl group.

The flame retardant treating process of the invention is a method which can be effectively carried out using a flame retardant treating agent according to the invention, and it is characterized by comprising (A) a flame retardant treating agent providing step wherein fiber is treated with a flame retardant treating agent containing a first phosphorus-based compound represented by formula (1) and/or a second phosphorus-based compound represented by formula (3), and (B) a heat treatment step wherein the fiber treated with the flame retardant treating agent is subjected to heat. The heat treatment step may be carried out after the flame retardant treating agent providing step, or the two steps may be carried out simultaneously.

The term "fiber" according to the invention includes natural fiber, artificial fiber and composite fiber of both types, with natural fiber including plant fiber, animal fiber and other types of natural fiber, and artificial fiber including regenerated artificial fiber, semi-synthetic fiber, synthetic fiber and other types of artificial fiber. As examples of synthetic fiber there may be mentioned polyester, nylon, acryl and polyurethane, as an example of semi-synthetic fiber there may be mentioned acetate, as an example of regenerated fiber there may be mentioned rayon, and as examples of natural fiber there may be mentioned cotton, hemp, silk and wool. These fibers may be in the form of fiber products such as yarn, woven fabrics, knitted fabrics, nonwoven fabrics, thread, rope or the like, but there is no limitation to these.

In this flame retardant treating process, a flame retardant treating agent according to the invention is attached onto the surface of the fiber or a portion thereof is incorporated into the molecular structure of the fiber and fixed to it, thereby incorporating the flame retardant treating agent with the fiber. The flame retardant treating agent will tend to infiltrate the amorphous regions of the fiber molecules. When the fiber treated with the flame retardant treating agent is heated, the dense molecular configuration is relaxed, allowing the flame retardant treating agent to infiltrate into the amorphous regions and promoting diffusion of the flame retardant treating agent into the amorphous regions. The coverage of the flame retardant treating agent on the fiber is therefore increased, and fixing of the flame retardant treating agent on the fiber is reinforced.

More specifically, in the heat treatment step the fiber is preferably heat treated at a temperature in the range of 100–220° C. to fix the flame retardant treating agent onto the fiber. If the temperature is below 100° C., the amorphous regions of the fiber molecules may not relax or expand enough to receive the phosphorus-based compound molecules or particles of the flame retardant treating agent. On the other hand, if the temperature is above 220° C., the fiber strength may be reduced or heat deformation may occur, depending on the type of fiber and the heating time.

Alternatively, the fiber may be immersed in a first treatment solution containing the flame retardant treating agent to treat the fiber with the flame retardant treating agent in the flame retardant treating agent providing step, and then the first treatment solution may be heated at a temperature in the range of preferably 90–150° C. and more preferably 110–140° C. in the heat treatment step to fix the flame retardant treating agent onto the fiber. Here, the first treatment solution may instead be heated beforehand in the aforementioned temperature range and the fiber then immersed therein.

If the temperature for the heat treatment step is below 90° C., the amorphous regions of the fiber molecules may not relax or expand enough to receive the phosphorus-based compound molecules or particles of the flame retardant treating agent, whereas if the temperature is above 150° C., the fiber strength may possibly be reduced or heat deformation may occur, although this will depend on differences in the type of fiber and the heating time.

It may also be useful to immerse the fiber in a second treatment solution containing the flame retardant treating agent and a carrier to treat the fiber with the flame retardant treating agent in the flame retardant treating agent providing step, and then heat the second treatment solution at a temperature in the range of preferably 80–130° C. in the heat treatment step to fix the flame retardant treating agent onto the fiber. Here, the second treatment solution may instead be heated first in the aforementioned temperature range and the fiber then immersed therein.

When this mode is employed, the carrier is emulsified or dispersed in the second treatment solution in the flame retardant treating agent providing step so that the carrier adsorbs onto the fiber and thereby promotes satisfactory fixing of the flame retardant treating agent in the molecular configuration of the fiber. The fiber may thus be adequately treated with the flame retardant treating agent even under gentle heating conditions (such as 80–130° C.). Furthermore, since the flame retarding treatment of the fiber is accomplished under such low temperature conditions, the heat burden on the fiber is alleviated, and strength reduction and heat deformation may be sufficiently prevented.

Flame retardant treated fiber according to the invention is fiber that has been treated with a flame retardant treating agent of the invention, and it comprises at least one (type) of a first phosphorus-based compound represented by formula (1) and a second phosphorus-based compound represented by formula (3) fixed onto the fiber. Also, the flame retardant treated fiber of the invention is effectively produced by the flame retardant treating process of the invention, whereby a flame retardant treating agent according to the invention is fixed onto the fiber.

BEST MODE FOR CARRYING OUT THE INVENTION

Preferred modes of the invention will now be explained in detail. A flame retardant treating agent of the invention comprises at least one (type) of a first phosphorus-based compound represented by formula (1) and a second phosphorus-based compound represented by formula (3). As examples for the first phosphorus-based compound there may be mentioned compounds represented by the following formulas (4) to (9):

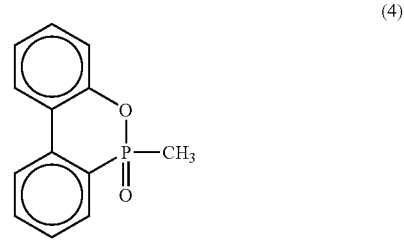

(4)

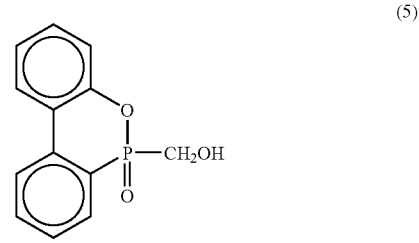

(5)

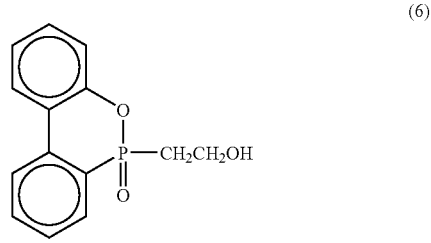

(6)

(7)

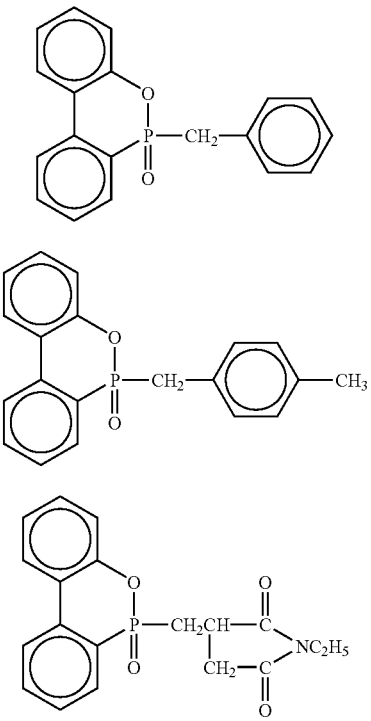

(8)

(9)

As examples for the second phosphorus-based compound there may be mentioned compounds represented by the following formulas (10) and (11):

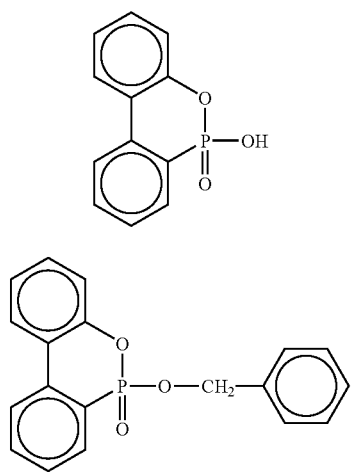

(10)

(11)

These first and second phosphorus-based compounds may be produced by the production processes disclosed, for example, in Japanese Examined Patent Publication SHO No. 50-17979, Japanese Unexamined Patent Publication SHO No. 55-124792 and Japanese Examined Patent Publication SHO No. 56-9178.

More specifically, a compound represented by formula (5), for example, may be obtained in the following manner. First, 216 g of 9,10-dihydro-9-oxa-10-phosphaphenanthrene-10-oxide is dissolved, and then 36 g of paraformaldehyde is added slowly at 130° C. and reaction is conducted for 4 hours. After the reaction, recrystallization is performed with ethyl cellosolve.

A compound represented by formula (10) may be obtained in the following manner. First, 90 g of a 30% sodium hydroxide aqueous solution is added to 216 g of 9,10-dihydro-9-oxa-10-phosphaphenanthrene-10-oxide and 150 g of ethylene glycol at 120° C., the mixture is kept at that temperature for 3 hours, and then the mixture is heated to 190° C. and kept at that temperature for 2 hours to complete the reaction. The reaction mixture is then cooled and rendered acidic with dilute sulfuric acid to obtain the target product.

A flame retardant treating agent according to the invention is supplied as a finely divided powder of the first phosphorus-based compound and/or second phosphorus-based compound, as an aqueous solution thereof dissolved, emulsified or dispersed in water, or as a solution or dispersion thereof in an organic solvent. The emulsifying or dispersing agent used for emulsification or dispersion of the first phosphorus-based compound and/or second phosphorus-based compound may be a conventionally used emulsifying or dispersing agent, with no particular restrictions.

Examples of emulsifying and dispersing agents which may be used include nonionic surfactants, for example, polyalkylene glycol types such as higher alcohol alkylene oxide addition products, alkylphenol alkylene oxide addition products, styrenated alkylphenol alkylene oxide addition products, styrenated phenol alkylene oxide addition products, aliphatic acid alkylene oxide addition products, polyhydric alcohol fatty acid ester alkylene oxide addition products, higher alkylamine alkylene oxide addition products, fatty acid amide alkylene oxide addition products, fat alkylene oxide addition products and polypropylene glycol ethylene oxide addition products, and polyhydric alcohol types such as glycerol fatty acid esters, pentaerythritol fatty acid esters, sorbitol and sorbitan fatty acid esters, sucrose fatty acid esters, polyhydric alcohol alkyl ethers, alkanolamine fatty acid amides; and anionic surfactants, for example, carboxylic acid salts such as fatty acid soaps, sulfuric acid esters such as higher alcohol sulfuric acid esters, higher alkyl polyalkylene glycol ether sulfuric acid esters, sulfated oils, sulfated fatty acid esters, sulfated fatty acids and sulfated olefins, alkyl benzene sulfuric acid salts, alkyl naphthalene sulfuric acid salts, formalin condensates such as naphthalenesulfonic acid, sulfonic acid salts such as α-olefin sulfonic acid salts, paraffin sulfonic acid salts, Igepon T types and sulfosuccinic acid diesters, and phosphoric acid esters such as higher alcohol phosphoric acid esters.

For a dispersion, dispersion stabilizers such as polyvinyl alcohol, methylcellulose, carboxymethyl cellulose, hydroxyethyl cellulose, xanthan gum and starch paste may be used.

The content of a dispersion stabilizer is preferably 0.05–5 wt % and more preferably 0.1–3 wt % with respect to the total weight of the flame retardant treating agent. If the content of the dispersion stabilizer is less than 0.05 wt %, aggregation or precipitation of the phosphorus-based compound tends to be insufficiently controlled, and if it is greater than 5 wt %, the viscosity of the dispersion increases, thus lowering the treatability of the fibers with the flame retardant treating agent. The average molecular weight of the dispersion stabilizer is preferably selected as appropriate to prevent aggregation or precipitation of the phosphorus-based compound in the content range mentioned above.

The solvent used for provision in the form of a solution dissolved in an organic solvent is not particularly restricted so long as it dissolves the first and/or second phosphorus-based compound, and examples include alcohols such as methanol, ethanol and isopropanol, aromatic hydrocarbons such as benzene, toluene and xylene, ethers such as dioxane and ethylene glycol, amides such as dimethylformamide and sulfoxides such as dimethylsulfoxide, any of which may be used alone or in combinations of two or more. From the standpoint of environmental consideration, it is preferably supplied as an aqueous solution or an emulsified or dispersed aqueous liquid.

When the flame retardant treating agent of the invention is in powder form, it may be pulverized by a publicly known process using a ball mill or the like. When it is an emulsified or dispersed aqueous liquid, there may be used an emulsifying or dispersing machine such as a homogenizer, colloid mill, ball mill, sand grinder or the like, as conventionally employed for production of emulsion or dispersion type flame retardant treating agents. The mean particle size of the first and/or second phosphorus-based compound used as the flame retardant treating agent is preferably no greater than 10 µm. A mean particle size of 10 µm or less will allow relatively easy emulsification or dispersion of the first and/or second phosphorus-based compound by the aforementioned emulsion or dispersion.

The flame retardant treating process, i.e. the process for obtaining flame retardant treated fiber according to the invention, is a process in which fiber is treated with the flame retardant treating agent of the invention (flame retardant treating agent providing step), and heat is applied to the fiber (heat treatment step) as post-treatment, and more specifically, it preferably employs one of the four types described below, for example. These flame retardant treating processes will be explained using polyester fiber woven fabric as the fiber. The polyester fiber used in this case is not particularly restricted, and for example, there may be mentioned regular polyester fiber, cationic dyeable polyester fiber and the like.

(First Process)

The first process is a process wherein the polyester fiber woven fabric is treated with a flame retardant treating agent by a flame retardant treating agent providing step, and then the polyester fiber woven fabric treated with the flame retardant treating agent is subjected to heat treatment at 100–220° C. in a heat treatment step. The process employed may be a dry heating or wet heating process involving a spray treating/dry curing system, a padding/drying/steaming system, a padding/steaming system, a padding/drying/curing system, or the like.

Specifically, the polyester fiber woven fabric is first subjected to spray treatment or padding treatment with the treatment solution, which is optionally diluted and contains the flame retardant treating agent of the invention, and dried, after which it is heat treated preferably at 100–220° C. and more preferably 160–190° C., for a period of, for example, 10 or more seconds or a few minutes. If the temperature is below 100° C., the amorphous regions of the molecules of the polyester fiber may not relax or expand enough to receive the phosphorus-based compound molecules or particles. A higher heat treatment temperature can result in firmer attachment of the flame retardant treating agent to the polyester fiber woven fabric, but if the heat treatment temperature exceeds 220° C. in the first process, the fiber strength of the polyester fiber woven fabric may be reduced or heat deformation may occur, although this will depend on differences in the heating time.

Carrying out the heat treatment in the preferred temperature range described above allows stable and more attachment of the first and/or second phosphorus-based compounds of the flame retardant treating agent to the amorphous regions of the polyester fiber molecules. As a result, it is possible to achieve sufficient flame retardance and cleaning durability for polyester fiber woven fabrics without using halogen-based compounds.

(Second Process)

The second process is a process wherein a polyester fiber woven fabric is treated with the flame retardant treating agent in the flame retardant treating agent providing step by immersing the polyester fiber woven fabric in a treatment solution which is optionally diluted and contains the flame retardant treating agent of the invention (first treatment solution), while heating the treatment solution in a heat treatment step for heat treatment of the polyester fiber woven fabric at a temperature of preferably 90–150° C. That is, the flame retardant treating agent providing step and heat treatment step are carried out simultaneously in this process.

Specifically, a package dyeing machine such as a liquid-flow dyeing machine, beam dyeing machine or cheese dyeing machine may be used for immersion heat treatment at a temperature of preferably 90–150° C. and more preferably 110–140° C., for several minutes to ten or more minutes, with the polyester fiber woven fabric immersed in the first treatment solution, in order to fix the flame retardant treating agent onto the polyester fiber woven fabric. If the temperature is below 90° C., the amorphous regions of the polyester fiber may not relax or expand enough to receive the phosphorus-based compound molecules or particles. On the other hand, if the temperature is above 150° C., the fiber strength of the polyester fiber woven fabric may be reduced or heat deformation may occur, depending on the heating time.

In this second process as well, therefore, carrying out the heat treatment in the preferred temperature range described above allows stable and more attachment of the first and/or second phosphorus-based compounds of the flame retardant treating agent to the amorphous regions of the polyester fiber molecules. As a result, it is possible to achieve sufficient flame retardance and cleaning durability for polyester fiber woven fabrics without using halogen-based compounds. Incidentally, a similar excellent flame retardant treating agent-fixing effect can also be achieved by preheating the first treatment solution to a temperature in the preferred range mentioned above before immersing the polyester fiber woven fabric, and then immersing the polyester fiber woven fabric therein.

(Third Process)

The third process is a process wherein a polyester fiber woven fabric is treated with the flame retardant treating agent in the flame retardant treating agent providing step by immersing the polyester fiber woven fabric in a treatment solution which is optionally diluted and contains the flame retardant treating agent and a carrier (second treatment solution), while heating the second treatment solution in a heat treatment step for heat treatment of the polyester fiber woven fabric at a temperature of preferably 80–130° C.

The carrier used here may be a carrier conventionally employed for carrier dyeing, and for example, there may be used chlorbenzene-based, aromatic ester-based, methylnaphthalene-based, diphenyl-based, benzoic acid-based or orthophenylphenol-based compounds, either alone or in combinations of two or more.

In the third process, the carrier emulsified or dispersed in the second treatment solution adsorbs onto the polyester fiber woven fabric, thereby promoting satisfactory fixing of the flame retardant treating agent into the molecular configuration of the polyester fiber woven fabric. As a result, it is possible to accomplish stable fixing of an adequate amount of the flame retardant treating agent onto the polyester fiber woven fabric even with heat treatment under gentler heating conditions, i.e., low temperature conditions of 80–130° C.

Because of the low heating temperature, thermal effects (thermal loading, thermal history, etc.) on the polyester fiber woven fabric during the heat treatment step are alleviated. It is thereby possible to adequately prevent strength reduction or heat deformation of the polyester fiber woven fabric during the heat treatment step. Moreover, the third process may accomplish the flame retardant treating agent providing step and the heat temperature step simultaneously, like the second process described above, or a second treatment solution may be heated to the aforementioned preferred temperature prior to immersion of the polyester fiber woven fabric.

The carrier content is preferably 0.1–10% o.w.f. ("on the weight of fiber", same hereunder) and more preferably 1.0–5.0% o.w.f, with respect to the weight of the treated polyester fiber woven fabric. If the carrier content is below the lower limit of this range, fixing of the flame retardant treating agent onto the polyester fiber woven fabric may not be sufficiently promoted. On the other hand, if it is above the higher limit of this range, the carrier may not easily emulsify or disperse in the treatment solution.

For adequate emulsification or dispersion of the carrier in the treatment solution, there may be appropriately added to the treatment solution a surfactant such as sulfated castor oil, an alkylbenzenesulfonic acid salt, a dialkylsulfosuccinic acid salt, polyoxyethylene (POE) castor oil ether, a POE alkylphenyl ether, or the like.

According to the invention, the amount of the first and/or second phosphorus-based compound fixed to the fiber may be appropriately determined depending on the type, form, etc. of the fiber, and in the case of polyester fiber, for example, it will preferably be 0.05–30 wt % and more preferably 1–15 wt % with respect to the total amount of polyester fiber containing the first and/or second phosphorus-based compound. If the fixing amount is less than 0.05 wt %, it becomes difficult to impart a sufficient degree of flame retardance to the polyester fiber. On the other hand, if the fixing amount exceeds 30 wt %, it will be difficult to achieve a greater flame retarding effect corresponding to the increased portion of the phosphorus-based compound, and instead, the feel of the polyester fiber will tend to be impaired and exhibit a hard feel.

In the second and third processes described above, the flame retardant treating agent may be fixed to the polyester fiber woven fabric by immersion heat treatment (flame retardant treating agent providing step+heat treatment step) at any stage before, during or after dyeing of the polyester fiber fabric, but it is preferably carried out simultaneously with dyeing from the standpoint of reducing the number of steps and working stages for increased working efficiency.

(Fourth Process)

The fourth process is a process wherein the polyester fiber woven fabric is treated by direct dusting of a powder of the flame retardant treating agent, and then the polyester woven fabric treated with the flame retardant treating agent is subjected to heat treatment at 110–220° C. in a heat treatment step. This process employs a dry heating or wet heating method involving a dusting/curing system, dusting/steaming system or the like. The heating conditions are the same as for the first process.

In the first to fourth processes described above, the heat treatment step is preferably followed by soaping treatment of the polyester fiber woven fabric by a common method, for removal of the phosphorus-based compound which is not firmly fixed to the polyester fiber woven fabric but merely gently (loosely) adhering to the surface thereof. The detergent used for the soaping treatment may be a common anionic, nonionic or amphoteric surfactant, or a mixture thereof.

To obtain a polyester fiber woven fabric requiring no cleaning durability, it is sufficient to merely attach the first and/or second phosphorus-based compound in the flame retardant treating agent onto the polyester fiber woven fabric, in which case the heat treatment step may essentially be omitted. A flame retardant property can be adequately imparted to a polyester fiber woven fabric so prepared.

As mentioned above, the fibers used for flame retarding treatment according to the invention are not particularly restricted, and instead of polyester there may be used, for example, synthetic fibers such as nylon, acryl and polyurethane, semi-synthetic fibers such as acetate, regenerated fibers such as rayon, natural fibers such as cotton, hemp, silk and wool, and composite fibers comprising them; however, polyester fiber is most preferred. There are no particular restrictions on the form of the fiber, which may be any fiber product such as, for example, yarn, a woven fabric, a knitted fabric, a nonwoven fabric, thread, rope or the like.

When a flame retardant treated fiber of the invention must exhibit light fastness or other properties in addition to flame retardance, benzotriazole-based or benzophenone-based ultraviolet absorbers or other fiber treatment agents used in the prior art may be added with the flame retardant treating agent of the invention so long as the flame retardant property is not impaired. As possible fiber treatment agents there may be mentioned antistatic agents, water/oil repellent agents, stain-proofing agents, hardness finishers, texture adjustors, softeners, antibacterial agents, hygroscopic agents, anti-slip agents and the like.

EXAMPLES

The present invention will now be explained in greater detail by way of the following examples, which are not intended to be limitative on the invention.

Example 1

To 40 g of the phosphorus-based compound represented by formula (4) there was added as a dispersing agent 5 g of an ethylene oxide 10 molar addition product of tristyrenated phenol, and then 53 g of water was added thereto while stirring. Next, 2 g of a 10 wt % aqueous solution of carboxymethyl cellulose was added as a dispersion stabilizer to obtain a flame retardant treating agent as a white dispersion.

Example 2

A flame retardant treating agent was obtained as a white dispersion in the same manner as Example 1, except that the phosphorus-based compound represented by formula (5) was used instead of the phosphorus-based compound represented by formula (4).

Example 3

A flame retardant treating agent was obtained as a white dispersion in the same manner as Example 1, except that the phosphorus-based compound represented by formula (7) was used instead of the phosphorus-based compound represented by formula (4).

Example 4

A flame retardant treating agent was obtained as a white dispersion in the same manner as Example 1, except that the phosphorus-based compound represented by formula (9) was used instead of the phosphorus-based compound represented by formula (4).

Example 5

A flame retardant treating agent was obtained as a white dispersion in the same manner as Example 1, except that the phosphorus-based compound represented by formula (10) was used instead of the phosphorus-based compound represented by formula (4).

Example 6

A flame retardant treating agent was obtained as a white dispersion in the same manner as Example 1, except that the phosphorus-based compound represented by formula (11) was used instead of the phosphorus-based compound represented by formula (4).

Example 7

To 40 g of the phosphorus-based compound represented by formula (7) there was added as a dispersing agent 5 g of a compound obtained by adding 10 moles of ethylene oxide to tristyrenated phenol and sulfonating the product, and then 53 g of water was added thereto while stirring. Next, 2 g of a 10 wt % aqueous solution of xanthan gum was added as a dispersion stabilizer to obtain a flame retardant treating agent as a white dispersion.

Example 8

A flame retardant treating agent was obtained by adding and dissolving 90 g of methanol in 10 g of the phosphorus-based compound represented by formula (7).

Example 9

To 40 g of the phosphorus-based compound represented by formula (8) there was added as a dispersing agent 5 g of a compound obtained by adding 15 moles of ethylene oxide to tristyrenated phenol and sulfonating the product, and then 53 g of water was added thereto while stirring. Next, 2 g of a 10 wt % aqueous solution of xanthan gum was added as a dispersion stabilizer to obtain a flame retardant treating agent as a white dispersion.

Comparative Example 1

To 40 g of hexabromocyclododecane there was added as a dispersing agent 5 g of an ethylene oxide 20 molar addition product of tristyrenated phenol, and then 53 g of water was added thereto while stirring. Next, 2 g of a 10 wt % aqueous solution of carboxymethyl cellulose was added as a dispersion stabilizer to obtain a flame retardant treating agent as a white dispersion.

(Flame Retardant Treating of Polyester Fiber Woven Fabric)

A polyester fiber woven fabric with a basis weight of 103 g/m$^2$, obtained using 75 denier/36 filament warp yarn and 105 denier/53 filament weft yarn composed of polyethylene terephthalate at a warp thread count of 8000/m and a weft thread count of 3200/m, was subjected to flame retardant treatment by the following treatment methods A, B and C, using the flame retardant treating agents obtained in Examples 1–9 and Comparative Example 1.

[Treatment Method A]

The polyester fiber woven fabric was subjected to padding treatment (70% contraction) with a treatment solution diluted to contain one of the flame retardant treating agents of the invention obtained in Examples 1–9 or the flame retardant treating agent obtained in Comparative Example 1 at 8 wt %, and was then dried at 110° C. for 5 minutes and subjected to heat setting treatment at 190° C. for 60 seconds.

[Treatment Method B]

The polyester fiber woven fabric was immersed in a treatment solution diluted to contain 1% o.w.f. of a disperse dye (C.I. Disperse Blue 56), 0.5 g/L of the dispersion level dyeing agent RM-EX (product of Nicca Chemical Co., Ltd.) and 6% o.w.f. of the flame retardant treating agent of the invention obtained in each of the Examples 1–9 or the flame retardant treating agent obtained in Comparative Example 1, to a liquor ratio of 1:15, and then a Minicolor Dyeing Machine (product of Texam Giken) was used for heat treatment at 130° C. for 30 minutes. The fabric was then subjected to reduction cleaning in an aqueous solution containing 1 g/L of the soaping agent Escudo FR (product of Nicca Chemical Co., Ltd.), 2 g/L of hydrosulfite and 1 g/L of caustic soda at 80° C. for 20 minutes, and after warm water washing and cold water washing, it was dried at 120° C. for 2 minutes.

[Treatment Method C]

The polyester fiber woven fabric was immersed in a treatment solution diluted to contain 1% o.w.f. of a disperse dye (C.I. Disperse Blue 56), 3% o.w.f. of benzoic acid as a carrier and 6% o.w.f. of the flame retardant treating agent of the invention obtained in each of the Examples 1–9 or the flame retardant treating agent obtained in Comparative Example 1, to a liquor ratio of 1:15, and then a Minicolor Dyeing Machine (product of Texam Giken) was used for heat treatment at 110° C. for 30 minutes. The fabric was then subjected to reduction cleaning in the same manner as Treatment method B, and after warm water washing and cold water washing, it was dried at 110° C. for 5 minutes.

(Flame Retardant Property Test)

The flame retardant treated polyester fiber woven fabrics obtained by treatment methods A to C described above were subjected to a flameproof performance test conducted as a flame retardant property test, according to Method D specified by JIS L1091. The flameproof performance test was evaluated for flame retardant treated polyester fiber woven fabrics after 5 washings according to JIS L1042 and after 5 dry cleanings according to JIS L1018. For the evaluation, the afterflame time and the number of times contacted with the flame were recorded 3 times in accordance with JIS. The results for the combinations of each of the flame retardant treating agents and each treatment method are summarized in Table 1. An untreated fabric identical to the flame retardant treated polyester fiber woven fabric was also subjected to a flameproof performance test in the same manner, and the results are shown in Table 1.

TABLE 1

| Flame retardant treating agent | Treatment method | Flameproof performance test | | | | | |
|---|---|---|---|---|---|---|---|
| | | Afterflame time (sec) | | | Times contacted with flame | | |
| | | No washing | After 5 washings | After 5 dry cleanings | No washing | After 5 washings | After 5 dry cleanings |
| Example 1 | A | 0, 0, 0 | 0, 0, 0 | 0, 0, 0 | 5, 4, 4 | 5, 4, 4 | 5, 4, 4 |
| Example 2 | A | 0, 0, 0 | 0, 0, 0 | 0, 0, 0 | 5, 5, 4 | 5, 5, 4 | 5, 5, 4 |
| Example 3 | A | 0, 0, 0 | 0, 0, 0 | 0, 0, 0 | 5, 5, 4 | 5, 5, 4 | 5, 5, 4 |
| Example 4 | A | 0, 0, 0 | 0, 0, 0 | 0, 0, 0 | 5, 5, 4 | 5, 5, 4 | 5, 5, 4 |
| Example 5 | A | 0, 0, 0 | 0, 0, 0 | 0, 0, 0 | 5, 5, 5 | 5, 5, 4 | 5, 5, 4 |
| Example 6 | A | 0, 0, 0 | 0, 0, 0 | 0, 0, 0 | 5, 4, 4 | 5, 5, 4 | 5, 5, 4 |
| Example 7 | A | 0, 0, 0 | 0, 0, 0 | 0, 0, 0 | 5, 5, 4 | 5, 4, 4 | 5, 5, 4 |
| Example 8 | A | 0, 0, 0 | 0, 0, 0 | 0, 0, 0 | 5, 5, 4 | 5, 5, 4 | 5, 5, 4 |
| Example 9 | A | 0, 0, 0 | 0, 0, 0 | 0, 0, 0 | 5, 5, 4 | 5, 5, 4 | 5, 5, 4 |
| Comp.Ex.1 | A | 0, 0, 0 | 0, 0, 0 | 0, 0, 0 | 4, 4, 4 | 4, 4, 4 | 4, 4, 4 |
| Example 1 | B | 0, 0, 0 | 0, 0, 0 | 0, 0, 0 | 5, 5, 4 | 5, 5, 4 | 5, 5, 4 |
| Example 2 | B | 0, 0, 0 | 0, 0, 0 | 0, 0, 0 | 5, 5, 5 | 5, 5, 4 | 5, 5, 4 |
| Example 3 | B | 0, 0, 0 | 0, 0, 0 | 0, 0, 0 | 5, 5, 4 | 5, 5, 4 | 5, 5, 4 |
| Example 4 | B | 0, 0, 0 | 0, 0, 0 | 0, 0, 0 | 5, 5, 5 | 5, 5, 4 | 5, 5, 4 |
| Example 5 | B | 0, 0, 0 | 0, 0, 0 | 0, 0, 0 | 5, 5, 5 | 5, 5, 4 | 5, 5, 5 |
| Example 6 | B | 0, 0, 0 | 0, 0, 0 | 0, 0, 0 | 5, 5, 4 | 5, 5, 5 | 5, 5, 4 |
| Example 7 | B | 0, 0, 0 | 0, 0, 0 | 0, 0, 0 | 5, 5, 4 | 5, 5, 4 | 5, 5, 5 |
| Example 8 | B | 0, 0, 0 | 0, 0, 0 | 0, 0, 0 | 5, 5, 4 | 5, 5, 4 | 5, 5, 4 |
| Example 9 | B | 0, 0, 0 | 0, 0, 0 | 0, 0, 0 | 5, 5, 4 | 5, 5, 4 | 5, 5, 4 |
| Comp.Ex.1 | B | 0, 0, 0 | 0, 0, 0 | 0, 0, 0 | 5, 4, 4 | 5, 4, 4 | 5, 4, 4 |
| Example 1 | C | 0, 0, 0 | 0, 0, 0 | 0, 0, 0 | 5, 5, 4 | 5, 5, 4 | 5, 5, 4 |
| Example 2 | C | 0, 0, 0 | 0, 0, 0 | 0, 0, 0 | 5, 5, 5 | 5, 5, 4 | 5, 5, 4 |
| Example 3 | C | 0, 0, 0 | 0, 0, 0 | 0, 0, 0 | 5, 5, 4 | 5, 5, 4 | 5, 5, 4 |
| Example 4 | C | 0, 0, 0 | 0, 0, 0 | 0, 0, 0 | 5, 5, 4 | 5, 5, 4 | 5, 5, 4 |
| Example 5 | C | 0, 0, 0 | 0, 0, 0 | 0, 0, 0 | 5, 5, 5 | 5, 5, 4 | 5, 5, 5 |
| Example 6 | C | 0, 0, 0 | 0, 0, 0 | 0, 0, 0 | 5, 5, 4 | 5, 4, 4 | 5, 5, 4 |
| Example 7 | C | 0, 0, 0 | 0, 0, 0 | 0, 0, 0 | 5, 4, 4 | 5, 5, 4 | 5, 5, 4 |
| Example 8 | C | 0, 0, 0 | 0, 0, 0 | 0, 0, 0 | 5, 5, 4 | 5, 5, 4 | 5, 5, 4 |
| Example 9 | C | 0, 0, 0 | 0, 0, 0 | 0, 0, 0 | 5, 5, 4 | 5, 5, 4 | 5, 5, 4 |
| Comp.Ex.1 | C | 0, 0, 0 | 0, 0, 0 | 0, 0, 0 | 5, 4, 4 | 5, 4, 4 | 5, 4, 4 |
| Untreated | — | 51, 51, 50 | 52, 51, 50 | 51, 50, 50 | 1, 1, 1 | 1, 1, 1 | 1, 1, 1 |

As clearly shown by the results in Table 1, the polyester fiber woven fabrics subjected to a flame retardant treating process of the invention using flame retardant treating agents of the invention (i.e., flame retardant treated fibers according to the invention) were shown to exhibit a superior flame retardant property by all of the treatment methods, compared to the conventional hexabromocyclododecane flame retardant treating agent. This effect was satisfactorily maintained for an excellent flameproof effect after both water washing and dry cleaning.

INDUSTRIAL APPLICABILITY

As explained above, the flame retardant treating agents, flame retardant treating process and flame retardant treated fibers of the invention can impart a highly washing-durable and dry cleaning-durable flame retardant property to fibers in a post-treatment step. Furthermore, since the flame retardant treating agents of the invention do not employ halogen compounds as flame retarding components, they generate no harmful halogen gases or residues during combustion even when the flame retardant treated fiber products are burned, for example, and they are therefore highly preferred from the standpoint of environmental conservation.

The invention claimed is:

1. A flame retardant treating agent for post-treatment of fibers comprising a dispersion stabilizer and at least one of the following:

a first phosphorus-based compound represented by the following formula (1):

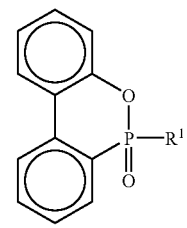

(1)

where $R^1$ represents a hydroxyalkyl or a substituted or unsubstituted aralkyl group, or a group represented by the following formula (2):

a first phosphorus-based compound represented by the following formula (1):

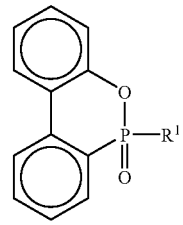
(1)

where $R^1$ represents a hydroxyalkyl or a substituted or unsubstituted aralkyl group, or a group represented by the following formula (2):

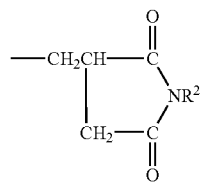
(2)

where $R^2$ represents an alkyl group of 1–10 carbons, and a second phosphorus-based compound represented by the following formula (3):

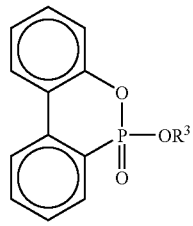
(3)

where $R^3$ represents a substituted or unsubstituted aralkyl group.

2. A flame retardant treating process comprising treating a fiber with a flame retardant treating agent according to claim 1, and heat treating the fiber treated with the flame retardant treating agent.

3. The flame retardant treating process of claim 2, including heat treating the fiber to a temperature in the range of 100–220° C. to fix the flame retardant treating agent to the fiber.

4. The flame retardant treating process of claim 2, including
immersing the fiber in a treatment solution containing the flame retardant treating agent, and heating the treatment solution to a temperature in the range of 90–150° C. to fix the flame retardant treating agent to the fiber.

5. The flame retardant treating process of claim 2, including immersing the fiber in a treatment solution containing the flame retardant treating agent and a carrier, and heating the treatment solution to a temperature in the range of 80–130° C. to fix the flame retardant treating agent to the fiber.

6. A flame retardant treated fiber comprising a fiber to which is fixed a dispersion stabilizer and at least one of the following:

a first phosphorus-based compound represented by the following formula (1):

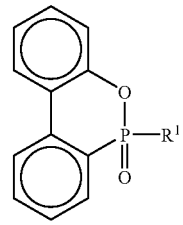
(1)

where $R^1$ represents a hydroxyalkyl or a substituted or unsubstituted aralkyl group, or a group represented by the following formula (2):

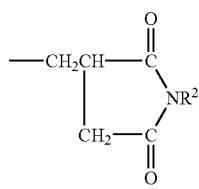
(2)

where $R^2$ represents an alkyl group of 1–10 carbons, and a second phosphorus-based compound represented by the following formula (3):

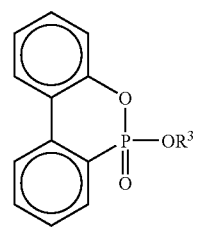
(3)

where $R^3$ represents a substituted or unsubstituted aralkyl group.

7. A flame retardant treated fiber produced by the flame retardant treating process of claim 2.

* * * * *